United States Patent
Bezeault

(10) Patent No.: US 11,247,712 B2
(45) Date of Patent: Feb. 15, 2022

(54) STEERING WHEEL FOR AUTONOMOUS MOTOR VEHICLE

(71) Applicant: NISSAN MOTOR CO., LTD., Yokohama (JP)

(72) Inventor: Loic Bezeault, Le Chesnay (FR)

(73) Assignee: NISSAN MOTOR CO., LTD., Yokohama (JP)

( * ) Notice: Subject to any disclaimer, the term of this patent is extended or adjusted under 35 U.S.C. 154(b) by 371 days.

(21) Appl. No.: 16/340,854

(22) PCT Filed: Oct. 16, 2017

(86) PCT No.: PCT/FR2017/052829
§ 371 (c)(1),
(2) Date: Apr. 10, 2019

(87) PCT Pub. No.: WO2018/073518
PCT Pub. Date: Apr. 26, 2018

(65) Prior Publication Data
US 2021/0179160 A1  Jun. 17, 2021

(30) Foreign Application Priority Data
Oct. 17, 2016  (FR) ........................................ 1660030

(51) Int. Cl.
*B62D 1/04* (2006.01)
*B62D 1/06* (2006.01)
*B62D 1/183* (2006.01)

(52) U.S. Cl.
CPC .............. *B62D 1/06* (2013.01); *B62D 1/183* (2013.01)

(58) Field of Classification Search
CPC ... B62D 1/04; B62D 1/06; B62D 1/08; B62D 1/10; B62D 1/105; B62D 1/11
See application file for complete search history.

(56) References Cited

U.S. PATENT DOCUMENTS

| | | | |
|---|---|---|---|
| 1,002,663 A * | 9/1911 | Fest ........................ | B62D 1/10 74/555 |
| 1,459,957 A * | 6/1923 | Merritt ..................... | B62D 1/04 74/555 |
| 1,847,209 A * | 3/1932 | Bolinas, Jr. ......... | B60R 25/0224 74/555 |
| 2,326,131 A | 8/1943 | Eschelbacher | |
| 10,562,558 B1 * | 2/2020 | Spahn ..................... | B62D 1/04 |
| 2007/0295151 A1 * | 12/2007 | Kentor ..................... | B62D 1/06 74/552 |
| 2016/0325662 A1 * | 11/2016 | Nash ....................... | B60N 3/005 |
| 2018/0154921 A1 * | 6/2018 | Bonello ................... | B62D 1/06 |

FOREIGN PATENT DOCUMENTS

| JP | 57-1760 U | 1/1982 |
|---|---|---|
| JP | 59-64368 U | 4/1984 |
| JP | 60-47670 U | 4/1985 |

\* cited by examiner

*Primary Examiner* — Richard W Ridley
*Assistant Examiner* — Brian J McGovern
(74) *Attorney, Agent, or Firm* — Foley & Lardner LLP

(57) ABSTRACT

The invention relates to a steering wheel for a motor vehicle, including a hub defining an axis of rotation, a main portion substantially in the shape of an arc of a circle secured to the hub and a complementary arc-shaped portion secured to said main portion. The complementary arc-shaped portion has two opposite ends each mounted with the ability to rotate on said main arc-shaped portion, in a manner substantially diametrically opposed.

4 Claims, 3 Drawing Sheets

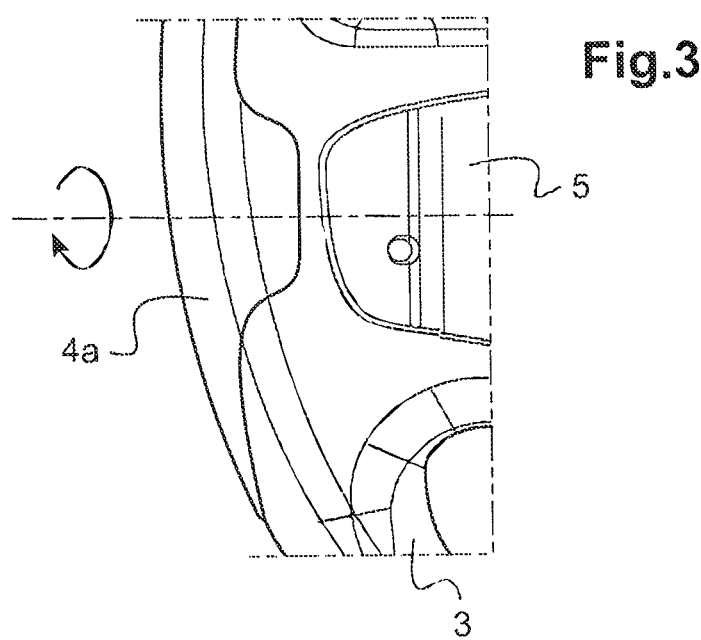
Fig.3
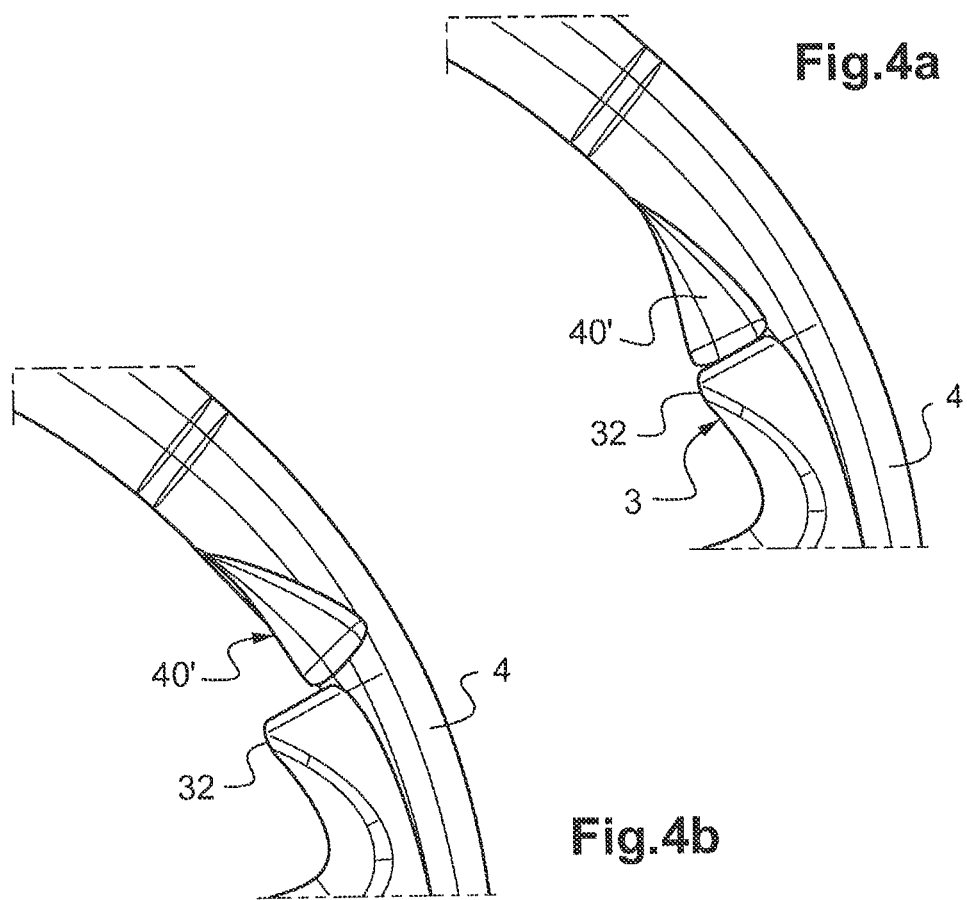
Fig.4a
Fig.4b

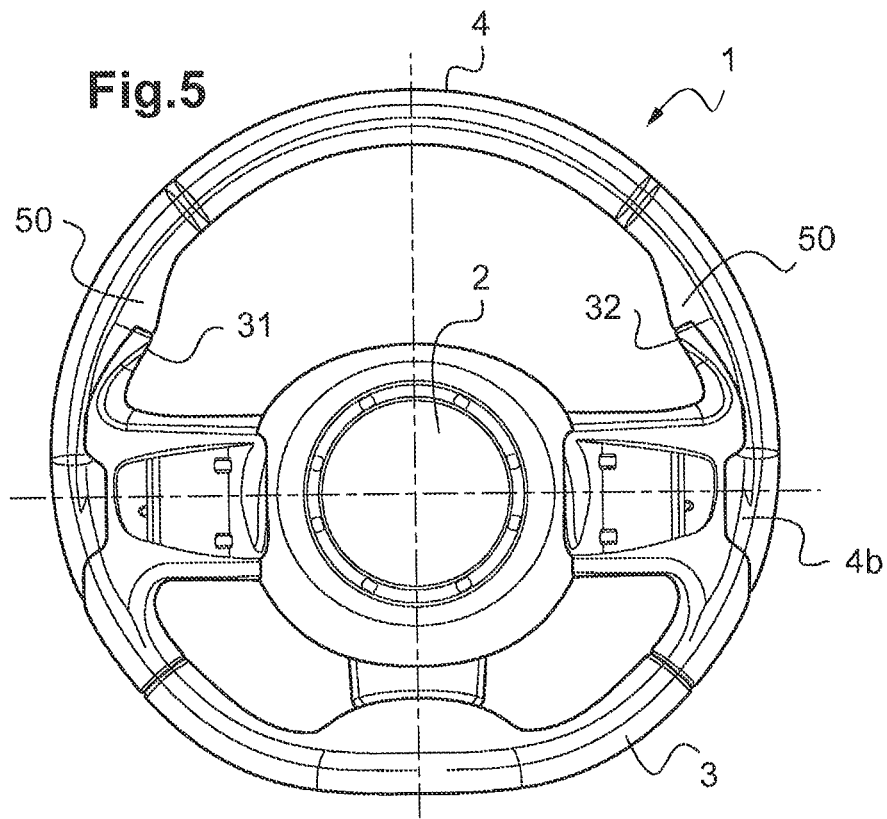
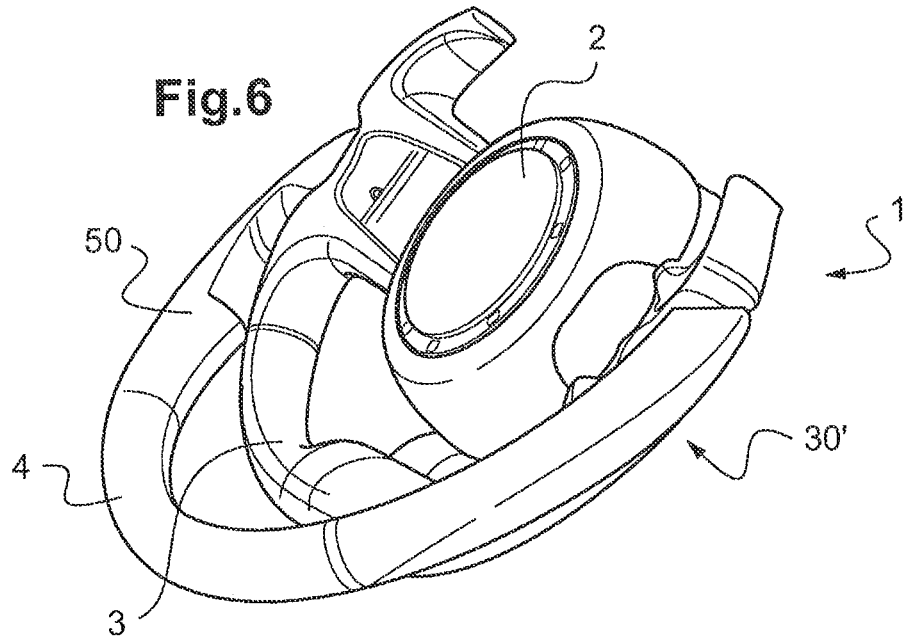

STEERING WHEEL FOR AUTONOMOUS MOTOR VEHICLE

The invention relates to a steering wheel for an autonomous motor vehicle.

An autonomous motor vehicle is a vehicle capable of running, steering and adapting to road traffic, without driver intervention.

When such a motor vehicle is operating autonomously, the passenger sitting in the driving seat is still free to take back control of the vehicle. He may notably take back control of the motor vehicle by operating the steering wheel.

However, when he does not wish to control the vehicle, the driver then generally adopts a resting pose, which differs greatly from his driving pose. In the resting pose, the driver is often seated more comfortably on the driving seat. His head then rests on the headrest and his torso is generally lower down than when he is driving.

This is why, when the driver of an autonomous motor vehicle is in a resting pose, his point of view across the vehicle instrument panel is different compared with his driving pose.

The steering wheel may then partially obstruct the driver's field of view, particularly when he is wishing to read information displayed on the display screen installed behind the steering wheel, which is known as a cluster, or near the bottom part of the windshield, notably with Head-Up Displays, more generally abbreviated to HUD.

In order to alleviate this problem, there is notably known a retractable steering wheel capable of passing from a driving position, in which the driver can operate it in order to steer the vehicle, to a retracted position in which the steering wheel is entirely set into the instrument panel, in order to free up the driver's field of view.

However, this type of steering wheel does not make it possible to afford the driver optimum safety because when the steering wheel is in the retracted position, the driver cannot take back control of the vehicle instantly, for example in an emergency situation.

Also known is a steering wheel that has an arc-shaped, notably C-shaped, main portion, defining two free ends and a complementary arc-shaped portion itself divided into two sub-arcs capable of retracting into the C-shaped portion via a translational insertion movement, via the two free ends respectively. When the vehicle is in autonomous operation, the driver can therefore retract the second arc-shaped portion, which corresponds more or less to an upper arc of the steering wheel when it is mounted in the passenger compartment, so that he can read the information displayed on the instrument panel behind the steering wheel.

However, such a solution requires a relatively complex mechanical design of the steering wheel so that the arc-shaped portion can be inserted into and pulled back out of the C-shaped portion.

So, there is still a need for a simpler steering wheel that can be adapted so that it does not impinge the driver's view when the driver is in a resting pose, while at the same time allowing it to be taken hold of again immediately.

To this end, the invention proposes a steering wheel for a motor vehicle, comprising a hub defining an axis of rotation, a main portion substantially in the shape of an arc of a circle secured to the hub and a complementary arc-shaped portion secured to said main portion.

Said complementary arc-shaped portion has two opposite ends each mounted with the ability to rotate on said main arc-shaped portion, in a manner substantially diametrically opposed.

In this way, there is obtained a relatively simple structure by means of which it is possible to retract half of the steering wheel, particularly the upper part of the steering wheel when it is mounted in the passenger compartment of the motor vehicle, so as to visually free up the upper space, while at the same time keeping the lower portion in a driving position that allows the steering wheel to be taken back hold of quickly.

Advantageously and nonlimitingly, said main portion defines two free ends, said two opposite ends being mounted for rotation respectively on said two free ends so that said complementary arc-shaped portion can be pivoted from a driving position in which the main arc-shaped and the complementary arc-shaped portion define a substantially toric convex shape, toward a retracted position in which the complementary arc-shaped portion is pivoted through at least 90°, for example through a value comprised between 90° and 180°, with respect to the driving position.

In this way, it is possible to articulate the complementary portion with respect to the main portion in a relatively simple way. Notably, rotation can be performed toward the rear of the motor vehicle, when the steering wheel is mounted in the passenger compartment, this having the effect of lowering the complementary portion by bringing it closer to the driver. Thus, the rotation can be relatively greater than if it were performed in the direction toward the instrument panel, and the driver may manipulate the complementary portion more easily, even when it is in the retracted position.

In particular, said complementary arc-shaped portion has a length substantially equal to said main portion.

Notably, the complementary and main portions each have an arc length greater than half the perimeter of the steering wheel so that their respective ends overlap.

Advantageously and nonlimitingly, the steering wheel comprises return means returning the complementary portion toward the driving position. Thus, automatic return from the retracted position to the driving position may be permitted, and this simplifies the process whereby the automobile driver takes back hold of the steering wheel.

Advantageously and nonlimitingly, said return means comprise a return spring. This makes it possible to obtain a return means that is robust and inexpensive to produce.

Advantageously and nonlimitingly, said return spring is secured on the one hand to the main portion and on the other hand to the complementary arc-shaped portion. Thus, it is a relatively simple matter to mount the return spring on the steering wheel.

Advantageously and nonlimitingly, the steering wheel comprises two diametrically opposed spokes each extending between the hub and the main arc-shaped portion, said complementary arc-shaped portion being mounted for rotation on the main portion in the vicinity of said two spokes.

Said spokes may be obtained as one piece with the main portion.

In particular, the return spring may be installed inside one of the two opposite spokes.

Advantageously and nonlimitingly, said main portion has a closed part joining the two diametrically opposed spokes and two free ends each extending from said closed part on the opposite side of the diametrically opposed spokes. The two free ends thus form parts which, when the steering wheel is in the retracted position, project, thereby making it simpler for the driver to take hold of the steering wheel again instantly if need be.

Advantageously and nonlimitingly, the steering wheel comprises locking means able to lock the complementary arc-shaped portion in the driving position. Thus, driving safety is increased by preventing the complementary arc-shaped portion from passing accidentally into the retracted position, for example when the driver is operating the steering wheel in order to drive the motor vehicle.

Advantageously and nonlimitingly, the locking means comprise at least one push-button installed on the complementary arc-shaped portion. Thus, the complementary arc-shaped portion can be unlocked, so as to be retracted, by pressing a push-button situated on the complementary arc-shaped portion, thus allowing unlocking that is simple for the driver to perform.

Advantageously and nonlimitingly, the steering wheel comprises immobilizing means capable of keeping the complementary portion in the retracted position. Thus, when the steering wheel is in the retracted position, the complementary portion can be kept fixed so that it does not inconvenience the driver in his resting pose.

Advantageously and nonlimitingly, the steering wheel comprises unlocking means capable of allowing the steering wheel to pass from the retracted position toward the driving position. In other words, the unlocking means allow the complementary portion fixedly held by the immobilizing means to be released so that it can return to the driving position.

The invention also relates to a motor vehicle comprising a steering wheel as described hereinabove.

Other specific features and advantages of the invention will become apparent from reading the description given hereinafter of one particular embodiment of the invention, given by way of nonlimiting indication, with reference to the attached drawings in which:

FIG. 3 is a view of detail of the junction between the complementary arc-shaped portion and the main arc-shaped portion of the embodiment of FIG. 1;

FIGS. 4a and 4b depict a view of detail of the steering wheel locking means according to the embodiment of FIG. 1;

FIG. 5 is a face-on view of a steering wheel in a driving position according to a second embodiment of the invention;

FIG. 6 is a face-on view of a steering wheel in a retracted position according to the embodiment of FIG. 5.

Figure 1:
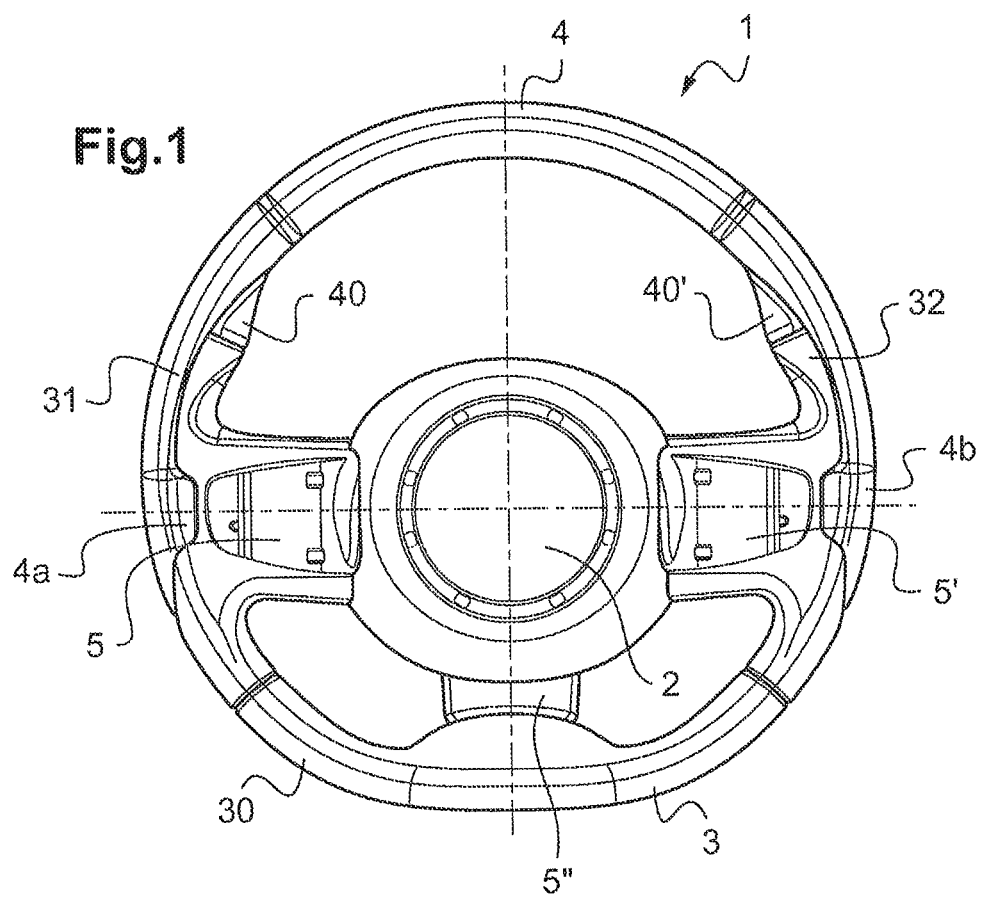
FIG. 1 is a face-on view of a steering wheel in a driving position according to a first embodiment of the invention.

According to a first embodiment, with reference to FIGS. 1, 2, 3, 4a and 4b, a steering wheel 1 comprises a hub 2, a main arc-shaped portion 3, also referred to as main portion 3, secured to the hub 2, and a complementary arc-shaped portion 4.

The main portion 3 is secured to the hub 2 by two spokes 5, 5' which are diametrically opposed with respect to the hub 2, and by a third spoke 5" oriented substantially perpendicular to the first two spokes 5', 5".

The spokes 5, 5', 5" are obtained as one piece with the main portion 3.

The main portion 3 has a closed part 30 joining the two diametrically opposite spokes 5, 5' and two free ends 31, each extending from said closed part 30 on the opposite side of the diametrically opposed spokes 5, 5'. In other words, the closed part 30 and the two diametrically opposed spokes 5, 5' more or less define a closed half-steering wheel, whereas the two free ends 31, each extend on the opposite side of a diametrically opposite spoke 5, 5' with respect to the closed part 30, so as to define two ends that the driver can grasp.

When the steering wheel 1 is mounted in the passenger compartment of a motor vehicle, the closed part 30 corresponds to the lower part of the steering wheel, whereas the two free ends 31, 32 extend upward beyond the diametrically opposed spokes 5, 5'.

The complementary arc-shaped portion 4, also referred to as the complementary portion 4, comprises two opposite ends 4a, 4b mounted for rotation on the main portion 3.

The opposite ends 4a, 4b are each mounted in the vicinity of one of the two diametrically opposed spokes 5, 5'.

Figure 2:
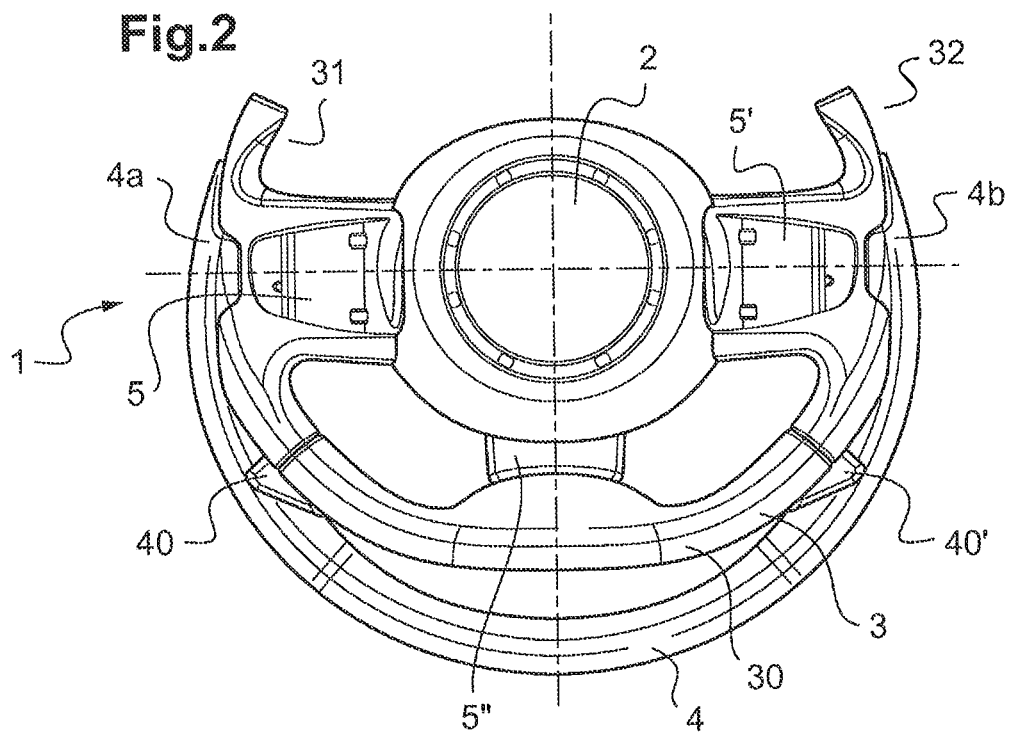
FIG. 2 is a face-on view of a steering wheel in a retracted position according to the embodiment of FIG. 1.

The complementary arc-shaped portion 4 is therefore able to pass from a first position, referred to as the driving position and depicted in FIG. 1, position in which in which the main arc-shaped 3 and the complementary arc-shaped portion 4 define a substantially toric convex shape, toward a second position, referred to as retracted position, depicted in FIG. 2, in which the complementary arc-shaped portion 4 is brought closer to the closed part 30 of the main arc-shaped portion 3.

Passage from the driving position toward the retracted position corresponding to rotation of the complementary portion 4 through at least 90°, in particular through an amount comprised between 150° and 180°, for example a rotation of 180°.

So, in the retracted position, after rotation through 180°, the complementary portion 4 extends in the same plane as the main portion 3. In other words, in the retracted position, the complementary portion 4 surrounds the main portion 3.

Rotation between the driving position and the retracted position is performed first of all toward the driver of the motor vehicle, in other words from the front toward the rear of the motor vehicle, so that the complementary portion 4 is moved away from the instrument panel.

When the steering wheel 1 is in the driving position, as depicted in FIG. 1, locking means prevent rotation toward the retracted position, as depicted in FIG. 2.

In this embodiment, the locking means 40, 40', as depicted in FIGS. 4a and 4b, comprise a push-button 40, 40' associated with each opposite end 4a, 4b of the complementary portion 4. In other words, the locking means 40, 40' comprise two push-buttons 40, 40'.

Each push-button 40, 40' is mounted on the complementary portion 4 in such a way as to be able to pass from a rest position, with reference to FIG. 4a, in which it projects from the complementary portion 4a, 4b, toward a pushed-in position, with reference to FIG. 4b, in which the push-button 40, 40' is pushed into the thickness of the complementary portion 4.

When the steering wheel 1 is in the driving position, the push-button 40, 40' in its rest position forms an end stop against a free end 31, 32 of the main portion 3. Thus, the push-button 40, 40' keeps the complementary portion 4 in the driving position.

Once the push-button 40, 40' is in its pushed-in position, it remains engaged there so that the complementary portion 4 can be pivoted freely toward the retracted position.

In the retracted position, the push-button 40, 40' is therefore kept pushed into the complementary portion 4, but once the rotation through 180° has been performed, it comes into contact with the main portion 3, as depicted in FIG. 2.

When the complementary portion 4 reaches the retracted position, it can be held there by an immobilizing member preventing it from pivoting freely. For example, push-button locking of the "push-pull" type. In the retracted position, the steering wheel is immobilized in the zone 4a, 4b by a system of flaps. In order to unlock, the complementary portion 4 is pushed toward the front of the vehicle. The flaps unlock during this small-amplitude rotational movement. The return spring then allows the complementary portion 4 to return to its driving position.

According to a second embodiment of the invention, with reference to FIGS. 5 and 6, locking means 50, 50' that lock the complementary portion 4 comprise at least one lug 50, 50', in this instance two lugs 50, 50', projecting from the complementary portion 4.

When the steering wheel 1 is in the driving position, each lug 50, 50' forms an end stop against a free end 31, 32 of the main portion 3. Thus, the lugs 50, 50' keep the complementary portion 4 in the driving position.

When the complementary portion 4 is pivoted toward the retracted position, the lugs 50, 50' come into abutment against the main portion 3, as depicted in FIG. 6.

So, rotation of the complementary portion is performed through a rotation of between 90° and 175°, for example between 160° and 170°, notably a rotation through 162°.

According to an alternative embodiment of the invention, which may notably be based on the first or second embodiment of the invention, the steering wheel 1 further comprises return means, not depicted, in this instance a return spring, for example a helical spring, for example a torsion spring, installed at one end on the main portion 3 or on one of the two diametrically opposed spokes 5, 5' and, on the other hand, at the complementary portion 4 so that it is able to return automatically from the retracted position toward the driving position.

The return means may also comprise one return spring per diametrically opposed spoke 5, 5' so that the return is performed on each opposite end 4a, 4b of the complementary portion 4.

For this alternative form of embodiment, an unlocking member, for example a push-button, or an electrical control, not depicted, allows the locking of the complementary portion 4 in the retracted position to be unlocked so as to allow the complementary portion 4 to be returned by the return spring from the retracted position toward the driving position.

The invention claimed is:

1. A steering wheel for a motor vehicle comprising:
a hub defining an axis of rotation,
a main portion substantially in the shape of an arc of a circle secured to the hub via two diametrically opposed spokes each extending between the hub and the main portion, and
a complementary arc-shaped portion secured to the main portion,
wherein the complementary arc-shaped portion has two opposite ends each mounted with the ability to rotate about a pivot axis on the main portion in a vicinity of each of the two diametrically opposed spokes such that the complementary arc-shaped portion can be pivoted from a driving position in which the main portion and the complementary arc-shaped portion define a substantially toric convex shape, toward a retracted position of the complementary arc-shaped portion, and
wherein the main portion comprises:
a closed part joining the two diametrically opposed spokes, and
two free ends each extending from the closed part on an opposite side of the diametrically opposed spokes beyond the diametrically opposed spokes,
wherein the arc length of the complementary arc-shaped portion is substantially equal to the arc length of the main portion.

2. The steering wheel as claimed in claim 1, wherein the complementary arc-shaped portion is pivoted from the driving position toward the retracted position through at least 90° with respect to the driving position.

3. The steering wheel as claimed in claim 1, further comprising a lock which locks the complementary arc-shaped portion in the driving position.

4. The steering wheel as claimed in claim 3, wherein the lock comprises at least one push-button installed on the complementary arc-shaped portion.

\* \* \* \* \*